United States Patent [19]
Miki

[11] Patent Number: 5,202,926
[45] Date of Patent: Apr. 13, 1993

[54] PHONEME DISCRIMINATION METHOD

[75] Inventor: Kei Miki, Tokyo, Japan

[73] Assignee: Oki Electric Industry Co., Ltd., Tokyo, Japan

[21] Appl. No.: 757,964

[22] Filed: Sep. 12, 1991

[30] Foreign Application Priority Data

Sep. 13, 1990 [JP] Japan .................... 2-242897
Sep. 13, 1990 [JP] Japan .................... 2-242898

[51] Int. Cl.$^5$ .............................................. G10L 5/00
[52] U.S. Cl. .............................................. 381/36; 381/31
[58] Field of Search .............................. 381/36–43, 381/31

[56] References Cited

U.S. PATENT DOCUMENTS

| | | | |
|---|---|---|---|
| 4,741,036 | 4/1988 | Bahl et al. | 381/43 |
| 4,833,712 | 5/1989 | Bahl et al. | 381/43 |
| 4,991,216 | 2/1991 | Fujii et al. | 381/43 X |
| 5,012,518 | 4/1991 | Liu et al. | 381/43 X |
| 5,033,087 | 7/1991 | Bahl et al. | 381/43 |

OTHER PUBLICATIONS

"Multi-Level Clustering of Acoustic Features for Phoneme Recognition Based on Mutual Information," by Katsuhiko Shirai, Noriyuki Aoki and Naoki Hosaka, 1989 IEEE, pp. 604–607.

*Primary Examiner*—Emanuel S. Kemeny
*Attorney, Agent, or Firm*—Edward D. Manzo

[57] ABSTRACT

To improve the accuracy of phoneme discrimination, a first phoneme discrimination method composes analyzing, not only static information on a voice but also dynamic information on the voice, power variations of the voice as a power-change pattern (PCP) and spectrum parameter variations of the voice as a time spectrum parameter pattern (TSP). After rough clustering based on the PCP, detailed classification is conducted using the TSP so that the voice is hierarchically discriminated to obtain phoneme symbols. This invention also provides a second phoneme discrimination method. To improve the accuracy of phoneme discrimination by a recognition system for unspecified, independent speakers, plural spectrum parameter codebooks classified in advance depending on voice qualities are provided. After rough clustering based on the PCP, the inputted voice is subjected to detailed discrimination with reference to plural codebooks corresponding to the PCP and also to voice quality determination, thereby obtaining phoneme symbols.

20 Claims, 10 Drawing Sheets

| 20 | 30 | 30 | 30 | 15 |

| PCP CODE (m) | POWER PATTERN ($Y^m$) | | | | |
|---|---|---|---|---|---|
| 1 | 30 | 30 | 30 | 30 | 30 |
| 2 | 15 | 30 | 30 | 30 | 20 |
| 3 | 10 | 20 | 30 | 40 | 40 |

Fig. 7

| PCP CODE | TSP | |
|---|---|---|
| 1 | 0 0 0 1 1 0 0 0 1 0 | ⎫ |
|   | 0 0 0 1 1 0 0 1 0 0 | ⎬ R(1) |
|   | ⋮ | |
|   | 0 0 0 0 0 0 0 0 0 0 | ⎭ |
| 2 | 0 0 1 0 0 1 1 1 0 0 | ⎫ |
|   | 0 0 1 0 0 1 1 0 0 0 | ⎬ R(2) |
|   | ⋮ | |
|   | 0 0 1 0 0 1 0 0 0 0 | ⎭ |
| ⋮ | ⋮ | |
| M | 0 0 1 1 0 0 1 1 0 0 | ⎫ |
|   | 0 0 1 1 0 0 1 1 0 0 | ⎬ R(M) |
|   | ⋮ | |
|   | 0 1 0 0 1 1 0 0 0 0 | ⎭ |

Fig. 8

| PCP CODE($c_i$) | TSP CODE($z_i$) | PHONEME CODE($L_i$) |
|---|---|---|
| 1 | 1 | a |
| | 2 | i |
| | 3 | u |
| 2 | 1 | u |
| | 2 | u |
| | 3 | e |
| | 4 | o |

| PCP CODE | SPECTRUM PARAMETERS | | | | | | | | | |
|---|---|---|---|---|---|---|---|---|---|---|
| | $\underbrace{\phantom{XXXXXX}}_{R(1,q)}$ | | | $\underbrace{\phantom{XXXXXX}}_{R(2,q)}$ | | | | $\underbrace{\phantom{XXXXXX}}_{R(M,q)}$ | | |
| 1 | 10 | 5 | 10 | 5 | 5 | 0 | | | | |
| | ⋮ | ⋮ | ⋮ | ⋮ | ⋮ | ⋮ | | | | |
| | 20 | 20 | 10 | 5 | 10 | 5 | | | | |
| 2 | 20 | 10 | 20 | 10 | 5 | 0 | | | | |
| | 10 | 5 | 0 | 20 | 20 | 20 | | | | |
| ⋯ | | | | | | | | | | |
| M | | | | | | | | | | | q=1, q=2, q=Q

Fig. 13

| OPTIMAL CODEBOOK($q_m$) | PCP CODE($C_i$) | SPECTRUM PARAMETER CODE($Z_l$) | PHONEME CODE($L_i$) |
|---|---|---|---|
| 1 | 1 | 1 | a |
| | | 2 | i |
| | | 3 | u |
| | 2 | 1 | u |
| | | 2 | u |
| | | 3 | e |
| 2 | 1 | 1 | e |
| | | 2 | i |
| | 2 | 1 | u |
| | | 2 | e |
| | | 3 | o |

PHONEME DISCRIMINATION METHOD

TECHNICAL FIELD

This invention relates to a phoneme discrimination method that is used in voice recognition systems.

BACKGROUND OF THE INVENTION

In past years, significant advances have been achieved in the field of isolated word recognition. However, in continuous speech recognition, especially for a large vocabulary, there still remain many unsolved problems. Both the computational complexity and massive storage requirements make the isolated and connected word recognition strategies based on a word model unfeasible for a large vocabulary needed for continuous speech recognition applications. One of the possible solutions is to recognize the basic phonetic units of the input speech.

One of the methods studied most extensively these days in this field is the phoneme recognition method. The term "phoneme recognition" means conversion of an input voice to a series of phonemes which are substantially equal to pronunciation symbols. The voice converted to such a series of phonemes is then converted, for example, to a suitable letter string (i.e. sentence) by using a word dictionary, grammatical rules and the like.

An advantage of phoneme discrimination is that expansion of vocabularies, recognizable sentence types, etc. can be achieved by separating acoustic level processing and letter string level processing from each other. A method for phoneme discrimination is proposed in "Multi-Level Clustering of Acoustic Features for Phoneme Recognition Based on Mutual Information" Proc. ICASSP-89, pp 604-607 (May 1989).

Further, there is motivation to attempt to recognize speaker-independent phonemes. Good phonetic decoding leads to good word decoding. The ability to recognize the various (e.g. English) phonemes accurately will undoubtedly provide the basis for an accurate word recognizer.

The outline of the conventional phoneme method disclosed in the above publication will be described below.

According to the phoneme discrimination method, the powers of individual frames and acoustic parameters (LLPB Mel-cepstrum coefficients) by an LPC analysis are obtained from input voice signals. Subsequent to the computation of four quantization codes to be described below, the phoneme label (the train of phoneme symbols) of each frame is determined from the combination of these quantization codes.

(1) With respect to each frame, a power-change pattern (PCP) created by differences between the power of the frame of interest and its preceding and succeeding frames is vector-quantized, so that power-change pattern (PCP) code indicative of the power-change patterns (PCP) of the voice waveform is obtained.

(2) As acoustic parameters, cepstrum codes are obtained by vector-quantizing the LPC Mel-cepstrum coefficients while using codebooks classified in advance in accordance with PCP codes.

(3) The gradient of a least square approximation line of the acoustic parameters is vector-quantized to determine a regression coefficient.

(4) The time-series pattern of the PCP codes is vector-quantized to obtain a PCP code sequence.

To achieve a high level of discriminating ability in phoneme discrimination, it is necessary to effectively analyze parameters which serve as various keys of a voice. When a human being wants to distinguish a voice, it has been proven through various experiments that the intensity variations of the voice and the time variance of its spectrum—dynamic information on the voice—become important keys, to say nothing of static information on the voice, namely, the intensity of the voice at a given moment and the tonal feature (spectrum) of the voice.

Although the above-described conventional phoneme discrimination method analyzes power variations, one of the key parameters in phoneme discrimination in the form of a characteristic power-change pattern (PCP) and which also takes into consideration the static information on the spectrum by relying upon acoustic parameters (LPC Mel-cepstrum coefficients), nothing has been taken into consideration in connection with variations in the voice spectrum. These variations are the most important key parameter for the discrimination of similar phonemes. Namely, the conventional phoneme discrimination method involves the problem that its phoneme discriminating ability is insufficient because it relies upon indirect evaluation by a PCP code sequence or the like or upon approximate evaluation by the gradient of the least squares approximation line of the acoustic parameters.

Thus, applying conventional methods to speaker-independent voice recognition systems is difficult because such systems require precise analysis of the spectrum structure, which these methods do not perform.

When a human being distinguishes a voice, he clusters the voice quality through a series of utterances in addition to a judgment based on the static information about the voice. The series of utterances includes a particular spectrum structure defined by the voice quality inherent to the speaker, so that the spectrum structure differs when uttered by a different speaker. A speaker-independent voice recognition system is therefore required to analyze precisely this spectrum structure. However, this aspect has not been taken into consideration. Namely, there is only one codebook to analyze the features of individual spectra, so the coding of all voices is conducted using this codebook. This results in the frequent allotment of a group of codes of a combination which would not occur when uttered by a single speaker, which is one reason for the unsuccessful improvement in recognition performance.

SUMMARY OF THE INVENTION

A first object of the present invention is to provide a phoneme discrimination method improved in its ability to discriminate phonemes by taking into direct consideration the variations of each voice spectrum, said variations being the most important key parameter for the discrimination of similar phonemes. In other words, using the time spectrum pattern indicative of the spectrum dynamics improves phoneme recognition accuracy.

A second object of the present invention is to provide a phoneme discrimination method which can achieve a high level of phoneme discriminating performance in a speaker-independent voice recognition system by precisely estimating the spectrum structure of the inputted voice. The spectrum structure is defined by the voice quality inherent in the speaker.

A further object is using the plural spectrum codebooks clustered beforehand in accordance with the voice structure inherent in the speakers to achieve a high level of recognition accuracy in speaker-independent voice recognition.

A first phoneme discrimination method for achieving the first object compromises:

(a) analyzing the frequency of an inputted voice to compute, at predetermined time intervals called "frames", spectrum parameters, and voice powers indicative of the intensity of the inputted voice;

(b) combining the voice powers of adjacent frames to compute a power-change pattern (PCP) indicative of the time variance of the voice powers;

(c) combining the spectra of neighboring frames to compute a time spectrum pattern (TSP) indicative of the time variance of the spectrum parameter;

(d) vector-quantizing the PCP using a PCP codebook, whereby the power-change pattern codes (PCP codes) are determined;

(e) vector-quantizing the TSP using a TSP codebook corresponding to the PCP codes in the respective frame, whereby the time spectrum pattern codes (TSP codes) are obtained; and (f) computing the likelihood of a phoneme of each frame in the light of the PCP codes and the TSP codes.

The above phoneme discrimination method analyzes variations in voice power in the form of a power-change pattern (PCP) as dynamic information on the voice, to say nothing of static information on the voice, namely, the difference in voice power or spectrum at a given moment. Further, after rough cluster by such a power-change pattern (PCP), detailed clustering is conducted using the TSP so that the voice is discriminated hierarchically. This has made it possible to achieve more efficient and higher discrimination performance than discrete use of the individual features.

A second phoneme discrimination method for attaining the second object comprises:

(a) analyzing the frequency of an inputted voice to compute, at predetermined time intervals called "frames", spectrum parameters and voice powers indicative of the intensity of the inputted voice;

(b) combining the voice powers of adjacent frames to compute a power-change pattern (PCP) indicative of the time variance of the voice powers;

(c) vector-quantizing the PCP using a PCP codebook whereby power-change pattern codes (PCP codes) are determined;

(d) vector-quantizing the spectrum parameter using plural spectrum parameters codebooks clustered beforehand in accordance with the voice structure inherent to speakers on the basis of the numerous voice data, whereby plural spectrum parameters codes and plural quantization errors (VQ errors) are obtained;

(e) selecting the spectrum parameter codebook so as to have the sum of the plural VQ errors minimized, and selecting optimal spectrum parameter codes on the basis of the selected spectrum parameter codebook; and (f) computing the likelihood of a phoneme of each frame in the light of the optimal spectrum parameter codes and the power codes.

According to this method, the plural spectrum parameter codebooks clustered beforehand in accordance with the voice structures are provided, and by comparing the inputted voice with the plural codebooks, detailed discrimination and voice structure judgment are conducted. It is therefore possible to perform discrimination of a voice of any structure while precisely analyzing its spectrum structure. According to this method, instead of providing plural codebooks for all features, a single codebook is used for pattern features of lower speaker dependency, but plural codebooks are employed for spectrum features which have high speaker dependency. By providing a suitable number of codebooks in accordance with the speaker dependency of each feature, it is possible not only to reduce the size of the data to be processed but also to perform more stable, precise clustering owing to the omission of processing for unnecessary dictionary items, thereby making it possible to provide efficient and high-level phoneme discrimination performance.

DETAILED DESCRIPTION OF PREFERRED EMBODIMENTS

The embodiments of the present invention will hereinafter be described in detail with reference to the drawings.

EXAMPLE 1

The first embodiment of this invention will be described with reference to FIG. 1 to FIG. 8.

Figure 1:
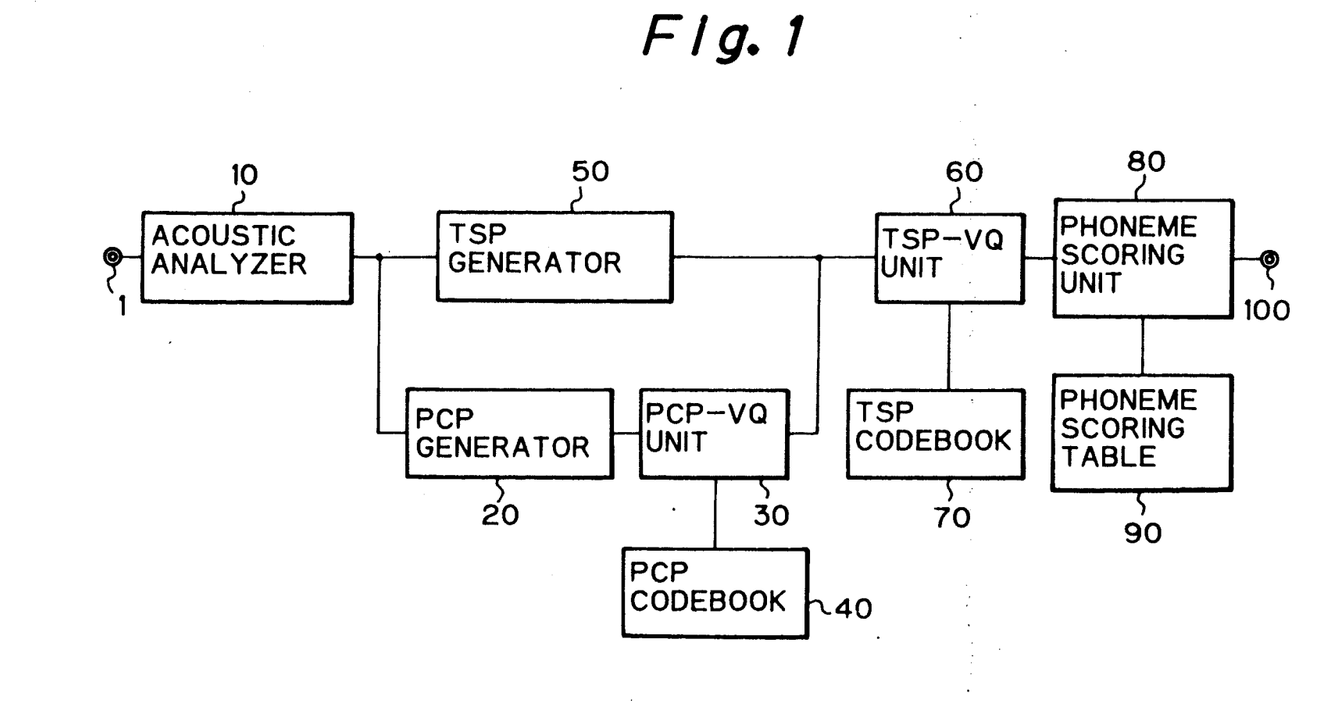
FIG. 1 is a block diagram showing the construction of a system useful in the practice of the first phoneme discrimination method according to a first embodiment of the present invention.
Figure 2:
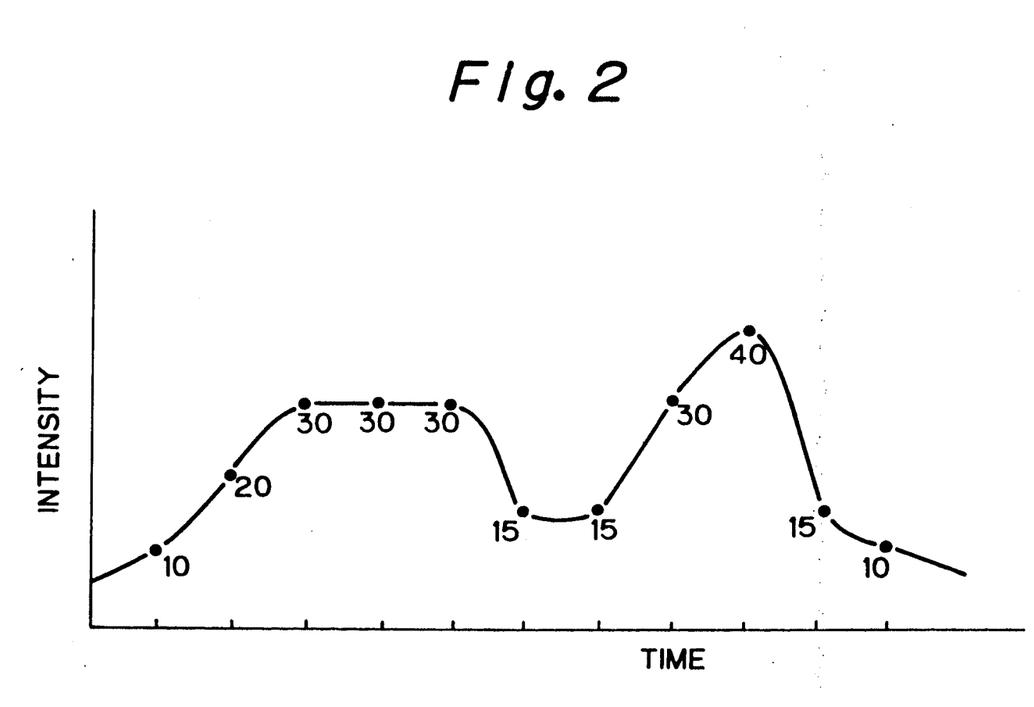
FIG. 2 is a diagram illustrating one example of the power of inputted voice signals.
Figure 3:
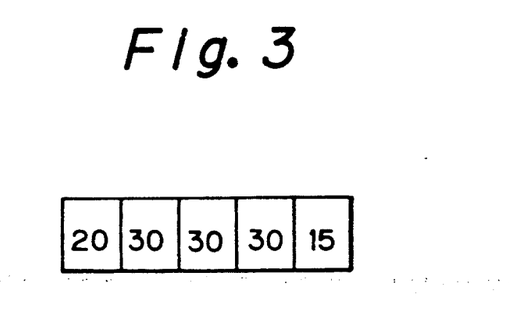
FIG. 3 is a diagram depicting one example of a power-change pattern (PCP) of a inputted voice.
Figure 4:
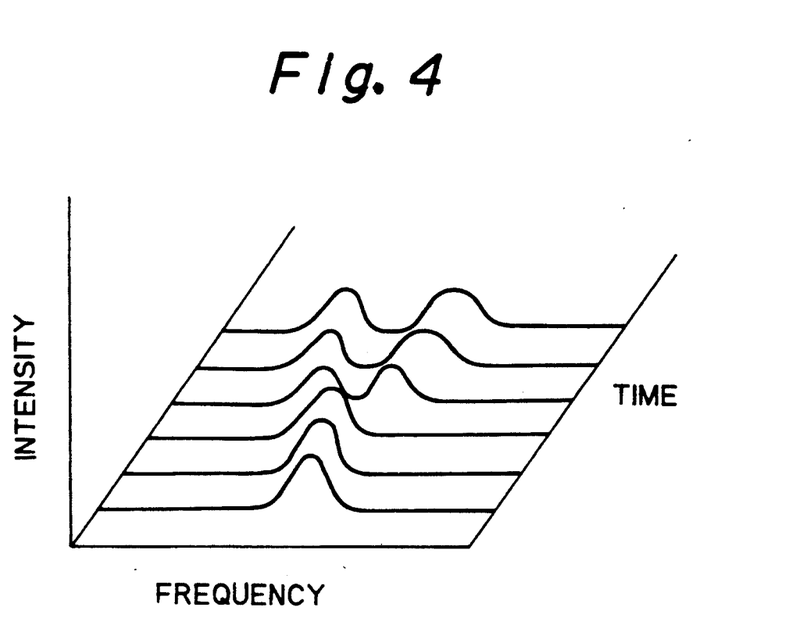
FIG. 4 is a diagram showing one example of the time variance of spectrum parameters.
Figure 5:
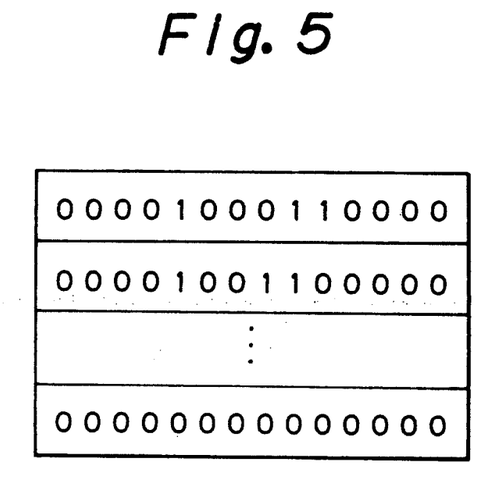
FIG. 5 is a diagram showing one example of a time spectrum parameter pattern (TSP)

FIG. 1 is a block diagram showing the construction of a system useful in the practice of the first phoneme discrimination method. In FIG. 1, the spectrum parameter of a voice collected by a microphone (not shown) is computed at an acoustic analyzer 10 from voice signals inputted from a voice input terminal 1. As an extraction method of the spectrum parameters, it may be contemplated to use a method which makes use of a group of plural bandpass filters with central frequencies shifted little by little, a method which uses a spectrum analysis by FFT (fast Fourier transformation), a method which uses a cepstrum analysis or a similar method. The method using the group of bandpass filters is employed in this embodiment.

Spectrum parameters $S_i$ are obtained by logarithmically converting band frequency components, which have been extracted by the group of J bandpass filters with different central frequencies, and sampling them at short intervals called "frames". The spectrum parameters $S_i$ can be expressed in a vector form as follows:

$$S_i=(S_{i1}, S_{i2}, \ldots, S_{ij}, \ldots, S_{iJ-1}, S_{iJ}) \quad (1)$$

where i is each frame number and j is the number of each bandpass filter. In the following description, the start frame number of the voice will be set at 0 while the end frame number of the voice will be set at I.

At the acoustic analyzer 10, the voice power $P_i$ (see FIG. 2) of each frame is also calculated in accordance with the following formula:

$P_i$=log (power of the input voice signals of i-th frame.)

At a PCP generator 20, a vector-form power-change pattern (PCP) $P_i$ (See FIG. 3) represented by the following formula (3) is computed by combining $(2n+1)$ voice powers of the i-th frame and the adjacent n frames preceding and succeeding the i-th frame, respectively:

$$P_i=(P_{i-n}, P_{i-n+1}, \ldots, P_{i-1}, P_i, \ldots, P_{i+n-1}, P_{i+n}) \quad (3)$$

Figure 6:
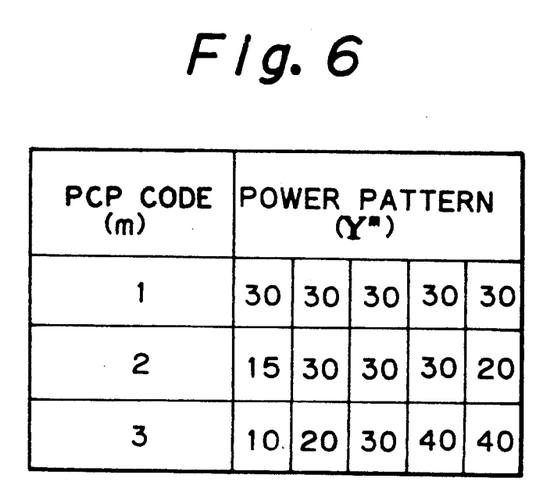
FIG. 6 is a diagram illustrating on e example of a power-change pattern (PCP) codebook.

The PCP $P_i$ is vector-quantized at a PCP-VQ unit 30 with reference to a PCP codebook 40 as shown in FIG. 6 so that a power-change pattern code (PCP code) $C_i$ is obtained in accordance with the following formula:

$$C_i = \operatorname*{argmin}_{m} d(P_i, Y^m) \quad (4)$$

$$Y^m = (Y^m_{-n}, Y^m_{-n+1}, \ldots, Y^m_{-1}, Y_0^m, \ldots, Y^m_{n-1}, Y_n^m) \quad (5)$$
$(m = 1, 2, \ldots, M)$ Here, $d(P_i, Y^m)$ indicates the distance between the PCP $P_i$ and the PCP $Y^m$ of the PCP code number m, and argmin means to determine the PCP code number which makes this distance shortest. M is the size of a PCP codebook. This power pattern quantization (PCP) is to estimate the inputted voice by the shape of the power-change pattern.

At a TSP (time spectrum pattern) generator 50, a vector-form TSP $T_i$ represented by the following formula is created by combining the $(2k+1)$ spectrum parameters of the i-th frame, whose spectrum parameter is $S_i$ and the adjacent k frames preceding and succeeding the i-th frame, respectively:

$$T_i=(S_{i-k}, \ldots, S_{i-1}, S_i, S_{i+1}, \ldots, S_{i+k}) \quad (6)$$

Figure 7:
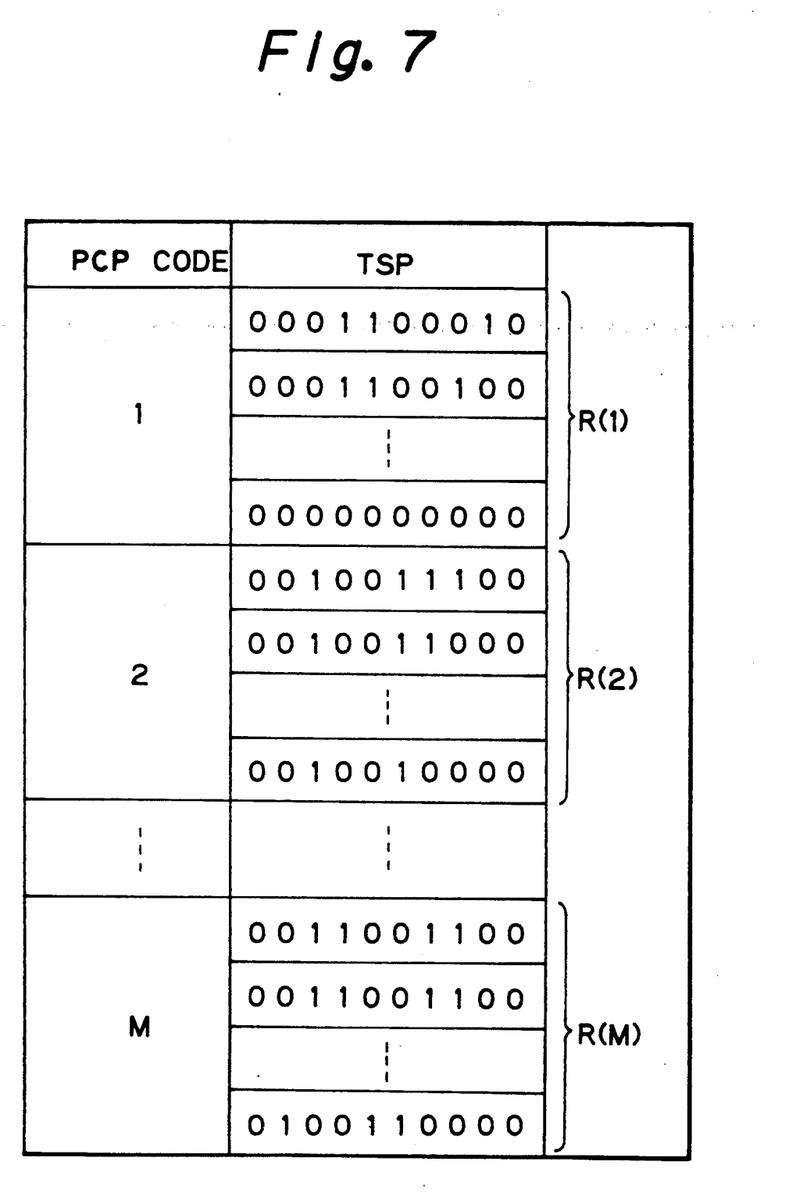
FIG. 7 is a diagram showing one example of a time spectrum parameter pattern (TSP) codebook.

At a TSP VQ unit 60, the TSP $T_i$ is vector-quantized based on TSP codebooks 70 as shown in FIG. 7. The TSP codebooks 70 consist of M codebooks stored in accordance with the PCP codes.

Time spectrum pattern code (TSP code) is used to conduct a detailed estimation based on accurate features of a voice and their variations in contrast to the rough estimation in the pattern quantization. First, the TSP codebook corresponding to the PCP code $C_i$ is selected from the TSP codebooks 70. In other words, this is equivalent to a change-over to a dictionary suitable for detailed discrimination in view of the results of the rough estimation. Vector quantization is performed using the codebook so selected. Supposing that the PCP code be $C_i$, a time spectrum pattern code $Z_i$ can be defined by the following formula:

$$Z_i = \operatorname*{argmin}_{r} d(T_i, U(C_i)^r) \quad (7)$$

$$U(C_i)^r = (U(C_i)^{r1}, U(C_i)^{r2}, \ldots, U(C_i)^{(2k+1)1}) \quad (8)$$
$(r = 1, 2, \ldots, R(C_i))$ where $U(C_i)^r$ corresponds to the PCP code $C_i$ and is a time spectrum parameter pattern (TSP) consisting of $(2k+1)*J$ elements, r is a code number allotted to each time spectrum parameter pattern (TSP), and $R(C_i)$ means the size of the TSP codebook corresponding to the PCP code $C_i$.

At a phoneme scoring unit 80, the PCP code $C_i$ and the time spectrum parameter pattern VQ code $Z_i$ are converted to the phoneme symbol $L_i$ which gives the highest probability given $C_i$ and $Z_i$. Although various methods may be used for this conversion, the simplest table look-up method will be described here.

Figure 8:
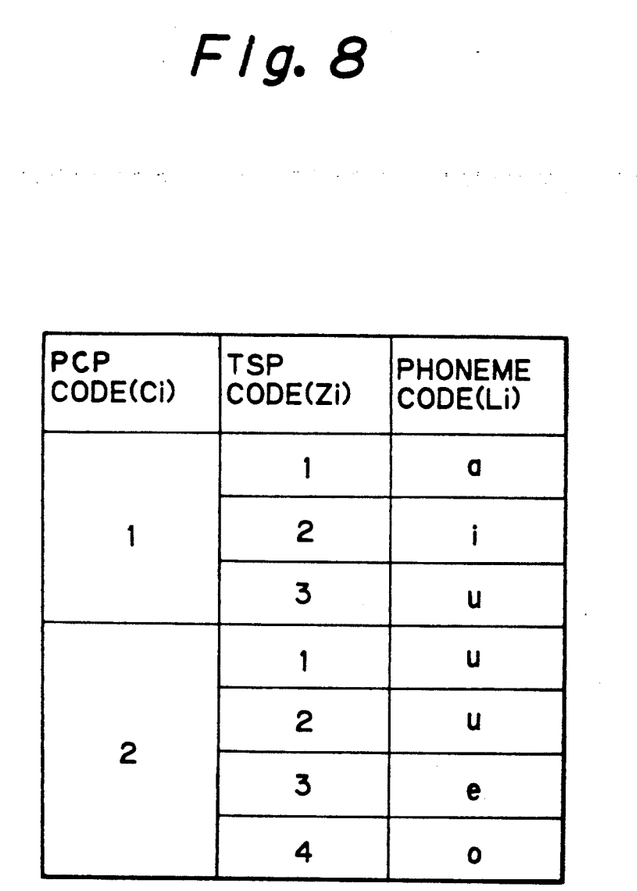
FIG. 8 is a diagram showing one example of a phoneme table employed in Example 1.

The construction of a phoneme scoring table 90 useful for the above conversion is illustrated in FIG. 8. For example, the phoneme symbol $L_i$ becomes "a" which is the most probable in the condition when $C_{i=1}$ and $Z_{i=1}$, and is "e" when $C_{i=2}$ and $Z_{i=3}$. In this manner, the inputted voice is converted into a train of phoneme symbols and is then outputted from an output terminal 100.

Various methods may be used for the preparation of the phoneme scoring table 90. One example of its preparation procedures will be described hereinafter.

(1) In advance, compute a power-change pattern (PCP) and time spectrum parameter pattern (TSP) on the basis of a number of voice data and store them as power-change pattern (PCP) data and time spectrum parameters pattern (TSP) data.

(2) Cluster the PCP data to prepare a PCP codebook.

(3) Vector-quantize the PCP data by using the PCP codebook, thereby preparing the power code data.

(4) Cluster the TSP data corresponding to the frames allotted with the same power code number out of the PCP data, so that a time spectrum parameters pattern (TSP) codebook is prepared. This processing is repeated equal to the number of power codes.

(5) Vector-quantize the TSP data by using the TSP codebook determined from the corresponding PCP code, thereby obtaining the time spectrum pattern code (TSP code) data.

(6) Prepare a phoneme table 90 indicative of the correlation among the phoneme code data allotted beforehand to hand-labeled voice data, the PCP code data, and the TSP code data.

EXAMPLE 2

Figure 9:
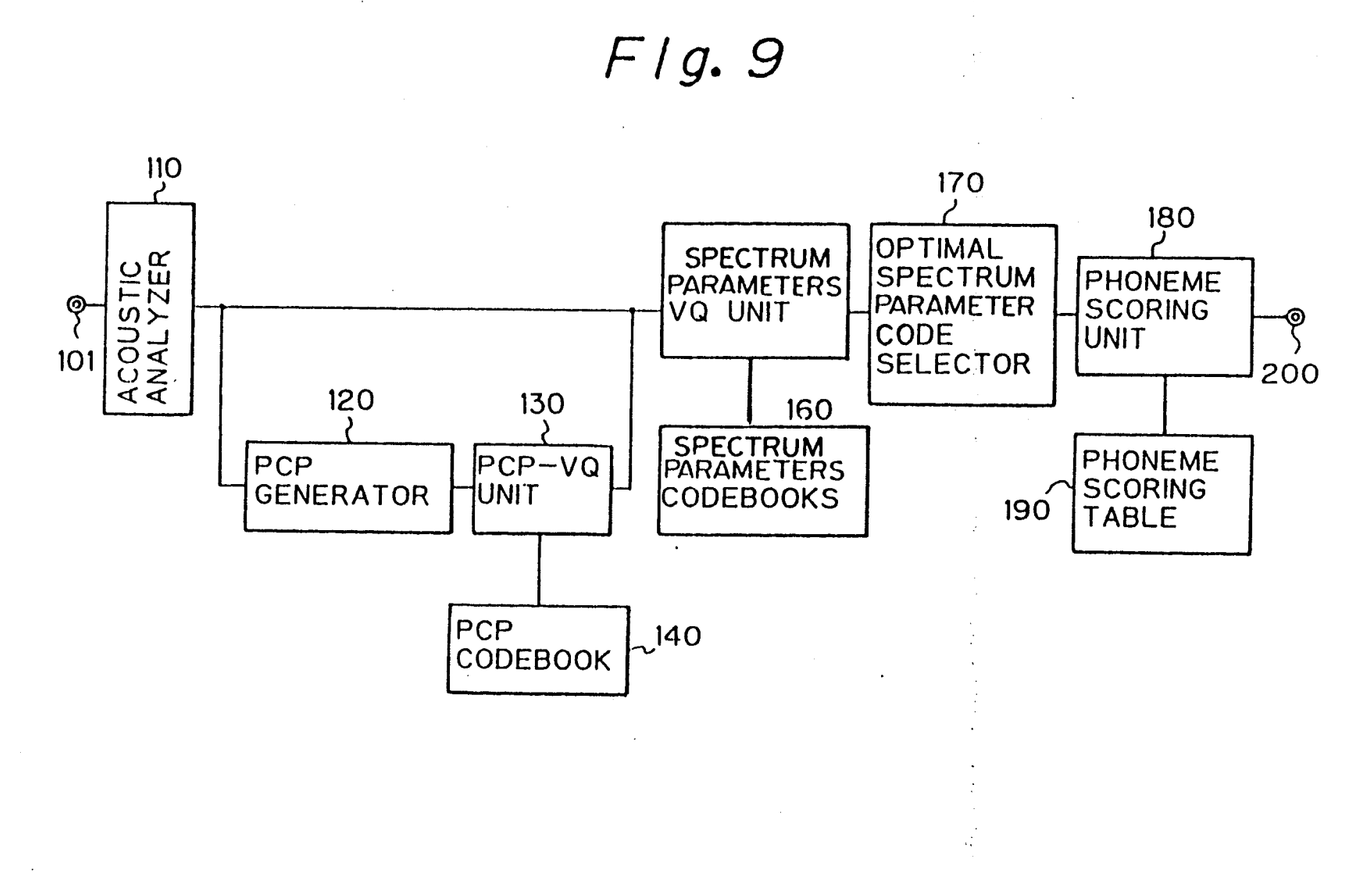
FIG. 9 is a block diagram showing the construction of a system useful in the practice of the second phoneme discrimination method according to a second embodiment of the present invention.
Figure 10:
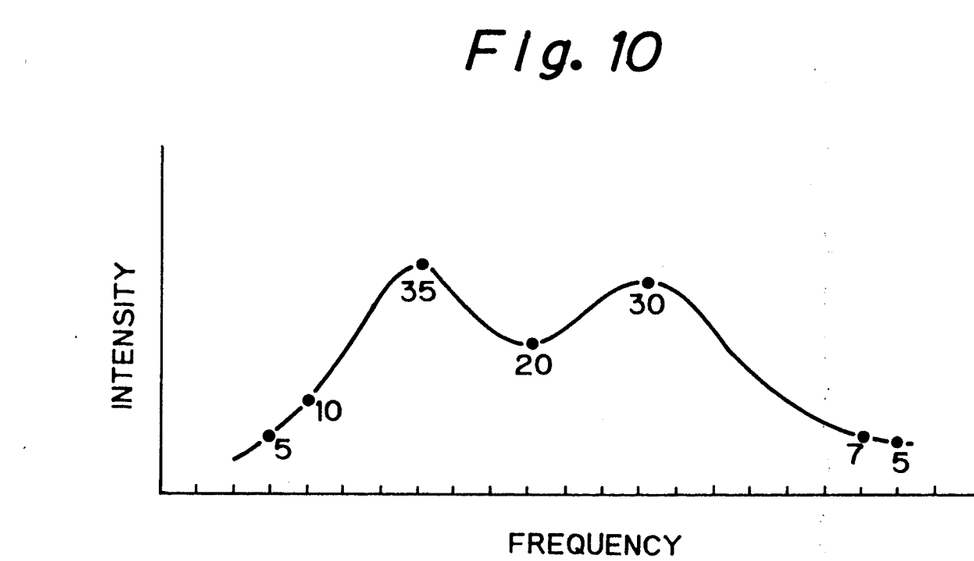
FIG. 10 is a diagram illustrating one example of the spectrum parameters of an inputted voice signal.

FIG. 9 is the block diagram showing the construction of the system useful in the practice of the second phoneme discrimination method of the present invention. In the drawing, acoustic analyzer 110, PCP generator 120, PCP-VQ unit 130 and PCP codebook 140 are either the same as or similar to the acoustic analyzer 10, PCP generator 20, PCP-VQ unit 30 and PCP codebook 40 in Example 1 (FIG. 1) so that their description is omitted herein.

Figure 12:
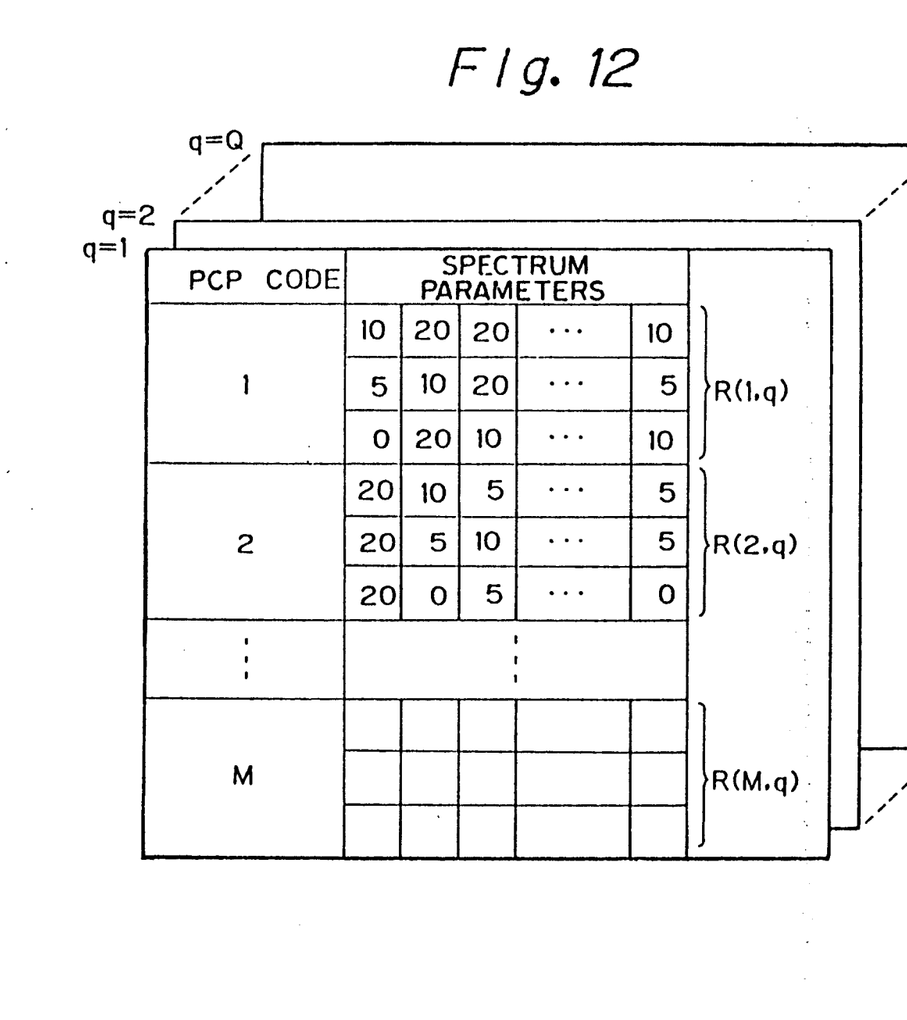
FIG. 12 is a diagram showing one example of a spectrum parameter codebook.

At a spectrum VQ unit 150 in this embodiment, vector quantization of spectrum parameters $S_i$ [see Formula (1)] is performed based on the plural spectrum parameter codebooks 160 as illustrated in FIG. 12.

The spectrum parameter codebooks 160 consist of Q types of codebooks prepared from numerous voice data and classified in advance into groups in terms of features of speakers characteristics, namely, parameters such as gender, age, voice quality and the like. Further, each codebook is formed of sub-codebooks classified depending on power-change pattern codes (PCP CODES). Namely, the spectrum parameters codebooks 160 consist of Q codebooks which are each formed of M sub-codebooks.

According to the spectrum parameter vector quantizing in this embodiment, Q sub-codebooks corresponding to a PCP code $C_i$ are selected and vector-quantization is carried out. The q-th sub-codebook corresponding to the PCP code $C_i$ is referred to, and a spectrum parameters code $z(q)_i$ and VQ error $V(q)_i$ represented by the following formulas, respectively, are computed:

$$z(q)_i = \operatorname*{argmin}_r d(S_i, X(q, C_i)^r) \quad (q = 1, 2, \ldots, Q) \tag{9}$$

$$V(q)_i = \min_r d(S_i, X(q, C_i)^r) \quad (q = 1, 2, \ldots, Q \tag{10}$$

$$X(q, C_i)^r = (X(q, C_i)^r 1, X(q, C_i)^r 2, \ldots, X(q, C_i)^r_f) \tag{11}$$
$$(r = 1, 2, \ldots, R(q, C_i))$$

where $X(q, C_i)^r$ is the spectrum parameter of the q-the sub-codebook corresponding to the PCP code $C_i$, r is a code number allotted to each spectrum parameter, and $R(q, C_i)$ is the size of the sub-codebook corresponding to the PCP code $C_i$.

At an optimal spectrum parameters code selector 170, the sum $W_q$ of the VQ errors $V(q)_i$ from the start frame to the end frame of the voice is computed in accordance with the following formula (12), and the codebook number $q_m$ of the codebook which makes $W_q$ smallest is determined by the following formula (13):

$$W_q = \sum_{i=0}^{I} V(q)_i \, (q = 1, 2, \ldots, Q) \tag{12}$$

$$q_m = \operatorname*{argmin}_q W_q \, (q = 1, 2, \ldots, Q) \tag{13}$$

The code obtained upon quantization of the spectrum parameter $S_i$ by the codebook corresponding to the number $q_m$ is an optimal spectrum parameter code $Z_i$. Namely, $Z_i$ is defined as follows:

$$Z_i = Z(q_m)_i \tag{14}$$

Figure 13:
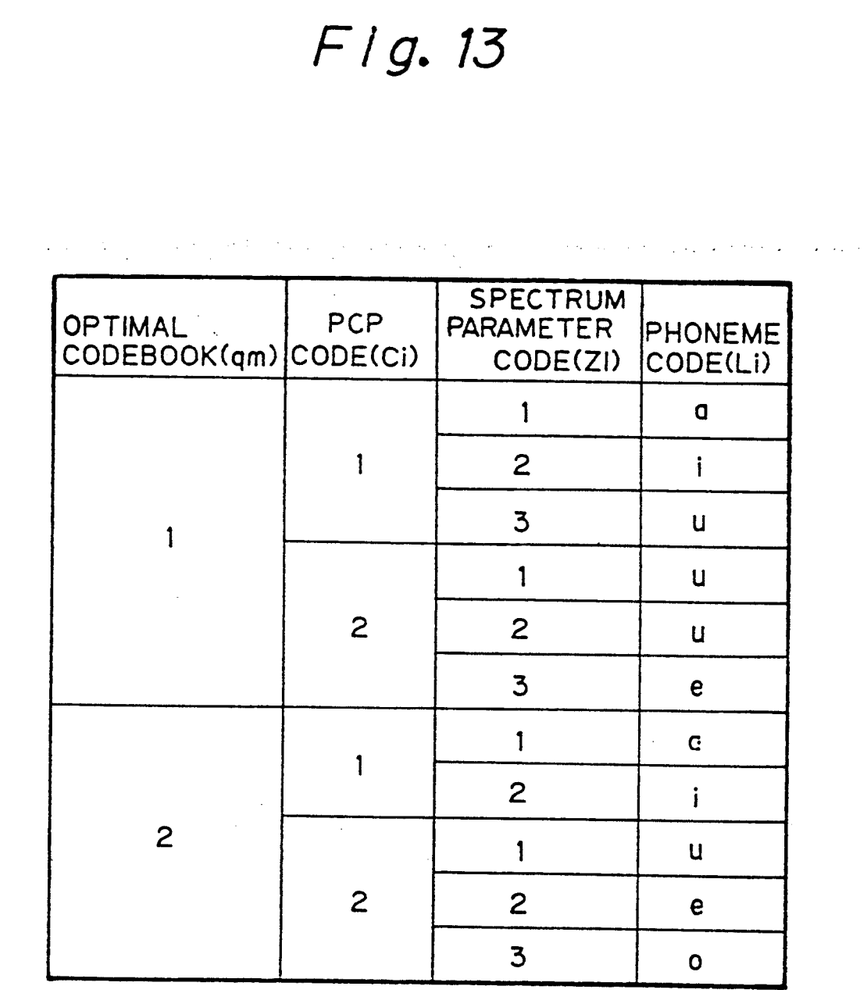
FIG. 13 is a diagram depicting one example of a phoneme table used in Example 2.

At a phoneme scoring unit 180, the PCP code $C_i$, optimal codebook number $q_m$ and optimal spectrum parameter code $Z_i$ are converted to the phoneme symbol $L_i$ which gives the highest probability given $C_i$, $q_m$ and $Z_i$. This conversion is conducted by the table look-up method as in Example 1. FIG. 13 shows an exemplary phoneme scoring table 190, which defines, for each optimal codebook number, the correlation between the PCP code and the optimal spectrum parameter VQ code and phoneme symbol. Accordingly, the phoneme symbol $L_i$ becomes "a" when $q_m=1$, $C_i=1$ and $Z_i=1$ and "e" when $q_m=2$, $C_i=2$ and $Z_i=2$. In this manner the inputted voice is converted to a train of phoneme symbols and then outputted from an output terminal 200.

Various methods may be used for the preparation of the phoneme scoring table. One example of its preparation procedures will be described hereinafter.

(1) In advance, cluster voice data uttered by many speakers considering the speakers characteristics, sexes, ages and voice qualities into several groups and allot speaker group code to the voice data.

Figure 11:
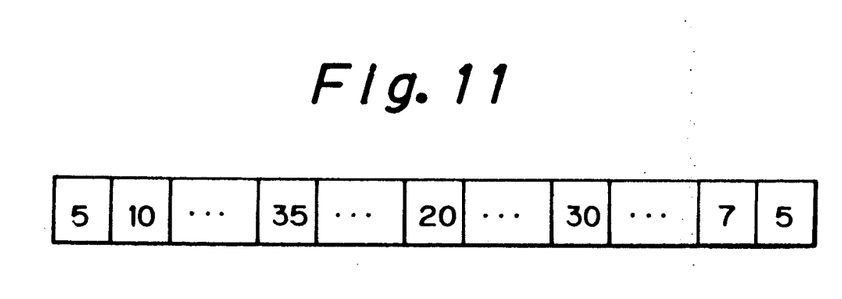
FIG. 11 is a diagram showing one example of spectrum data parameters.

(2) Compute power-change patterns (PCPs) and spectrum parameters of the voice data and store them as PCP data (see FIG. 3) and spectrum parameters data (see FIG. 11), respectively.

(3) Cluster the PCP data to prepare PCP codebooks.

(4) Vector-quantize the PCP data by using the PCP codebook, thereby preparing PCP code data.

(5) Classify the spectrum parameters data in accordance with the speaker group code into grouped spectrum parameters data.

(6) Classify the individual grouped spectrum parameters data in accordance with the power codes, whereby the grouped spectrum parameters data are clustered to prepare sub-codebooks. It is the spectrum parameter codebooks 150 (see FIG. 12) that these sub-codebooks are put together.

(7) Vector-quantize the grouped spectrum parameter data by using the sub-codebooks determined from the corresponding PCP code, thereby obtaining spectrum parameter code data.

(8) Prepare, for each of the group numbers, a phoneme table 190 indicative of correlation amount the individual codes from phoneme code data allotted beforehand to the hand-labeled voice data, the spectrum parameter code data and the PCP codes.

Tables 2 and 3 show the improvements of the first and second embodiments over over a conventional method of phoneme recognition, respectively. In Table 2, (a) is the phoneme recognition accuracy of the conventional method and (b) is the phonem recognition accuracy of the first embodiment. In Table 3, (c) is the phoneme recognition accuracy of the conventional method and (d) is the phoneme recognition accuracy of the second embodiment.

The values of (a), (b), (c), and (d) are estimated in the same condition and the same database. The speech database consists of connected 4-digits uttered in Japanese by 75 male and 75 female speakers.

The discriminated phoneme categories are shown in Table 1.

TABLE 1

| The Discriminated Phoneme Categories | |
|---|---|
| a, e, i, o, u | Vowel |
| j | Semivowel |
| I, U | Devocalized vowel |
| n, N | Nasal |
| r | Liquid |
| g, k | Plosive |
| z, h, s, c | Fricative |
| , | Pause |

TABLE 2

Phoneme Recognition Results with Various-Width TSP, "PCP + TcP$_k$" means PCP-VQ and TSP-VQ of cepstra with k-th frame width. A frame Phoneme score considered with neighbor Ns frame TSP codes.

RECOGNITION IN OPEN DATA

| Ns frame | 1 | 3 | 11 | 19 | 27 |
|---|---|---|---|---|---|
| PCP + TcP$_1$ | 45.8% | 53.8% | 62.6% | 65.4% | (a)65.3% |
| PCP + TcP$_5$ | 53.0% | 58.7% | 66.1% | 68.8% | 69.3% |
| PCP + TcP$_9$ | 57.5% | 63.2% | 69.7% | 72.2% | 73.1% |
| PCP + TcP$_{13}$ | 61.2% | 66.3% | 72.5% | 74.1% | (b)74.8% |

TABLE 3

Phoneme Recognition Results with Several Dynamic Features. "(c$_1\Delta$c$_9$)" means a single codebook with multi-features, cepstrum and $\Delta$cepstrum over 5 frames. "(c$_1\Delta$c$_9$) (c$_1\Delta$c$_{13}$)" means double codebooks with (c$_1\Delta$c$_9$) and (c$_1\Delta$c$_{13}$), respectively. A frame phoneme score considered with neighbor 27 frame TSP codes.

| Feature | Recognition Accuracy | |
|---|---|---|
|  | Training | Open |
| PCP +(c$_1\Delta$c$_5$) | 87.2% | 70.3% |
| PCP + (c$_1\Delta$c$_9$) | 89.7% | 75.4% |
| PCP + (c$_1\Delta$c$_9$) (c$_1\Delta$c$_{13}$) | 90.6% | 76.9% |
| PCP + TSP$_9$ | 89.4% | 73.1% |
| PCP + TSP$_{13}$ | 89.6% | 74.7% |
| PCP + T(c$_1\Delta$c$_9$)P$_9$ | 90.0% | 78.2% |
| PCP +T(c$_1\Delta$c$_9$)P$_{13}$ | 90.2% | (c)79.0% |
| PCP + multi-T(c$_1\Delta$c$_9$)P$_{13}$ | 90.7% | (d)79.4% |

It is to be noted that the present invention is not limited to the above embodiments but various modifications are feasible based on the subject matter of the present invention. Such modifications shall not be excluded from the scope of the present invention.

I claim:

1. A phoneme discrimination method comprising the steps of:
    analyzing the frequency of an inputted voice signal to compute, for predetermined time frame intervals, voice spectrum parameters and voice powers indicative of the intensity of the inputted voice;
    combining the voice powers of adjacent frames to provide a power-change pattern (PCP) indicative of the time variance of the voice powers;
    combining the spectrum parameters of neighboring frames to provide a time spectrum pattern (TSP) indicative of the time variance of the spectrum parameters;
    vector-quantizing the PCP to determine power-change pattern codes (PCP codes);
    vector-quantizing the TSP using a TSP codebook corresponding to the PCP-VQ codes in the respective frames to obtain TSP codes; and
    determining the probable phoneme symbol of each time frame interval via a correlation of phoneme symbols to PCP code and TSP code.

2. A phoneme discrimination method comprising the steps of:
    analyzing the frequency of an inputted voice signal to obtain, for predetermined time frame intervals voice spectrum parameters and voice powers indicative of the intensity of the inputted voice;
    combining the voice powers of adjacent frames to provide a power-change pattern (PCP) indicative of the time variance of the voice powers;
    vector-quantizing the PCP to obtain power-change pattern VQ codes (PCP-VQ codes);
    vector-quantizing the spectrum parameters using plural spectrum parameter codebooks to obtain plural spectrum parameter VQ codes and plural quantization errors (VQ errors);
    selecting the spectrum parameter codebook to minimize the sum of the plural VQ errors, and selecting optimal spectrum parameter codes on the basis of the spectrum parameter codebook so selected; and
    determining the probable phoneme symbol of each frame via a correlation of phoneme symbols to a selected codebook, an optimal spectrum parameter code and a PCP code.

3. The method of claim 1 wherein said determining step includes using a table of data correlating phonemes to PCP code data and TSP code data.

4. The method of claim 1 wherein said steps of vector-quantizing include referencing one or more previously prepared codebooks.

5. The method of claim 1 wherein said step of vector-quantizing the PCP includes operating a PCP-VQ unit which references a previously-prepared PCP codebook.

6. The method of claim 5 wherein said step of vector-quantizing the TSP includes operating a TSP-VQ unit which references a previously-prepared TSP codebook.

7. The method of claim 1 wherein said step of vector-quantizing the TSP includes operating a TSP-VQ unit which references a previously-prepared TSP codebook.

8. The method of claim 1 wherein said PCP vector-quantization step is in accordance with the formula:

$$C_i = \underset{m}{\operatorname{argmin}}\, d(P_i, Y^m)$$

$$Y^m = (Y^m_{-n}, Y^m_{-n+1}, \ldots, Y^m_{-1}, Y_0^m, \ldots, Y^m_{n-1}, Y_n^m)$$

where the index m is an integer ranging from 1 to M, where d(P$_i$, Y$^m$) indicates the distance between the PCP P$_i$ and the PCP Y$^m$ of the power code number m, where argmin means to determine the power code number which makes said distance shortest, and where M is the size of a PCP codebook.

9. The method of claim 1 wherein said step of vector-quantizing the TSP includes selecting the TSP codebook corresponding to the PCP code from a set of TSP codebooks and vector quantizing using the codebook so selected.

10. The method of claim 9 wherein said step of vector-quantizing the TSP is in accordance with the following formula:

$$Z_i = \underset{r}{\operatorname{argmin}}\, d(T_i, U(C_i)^r)$$

$$U(C_i)^r = (U(C_i)^{r,1}, U(C_i)^{r,2}, \ldots, U(C_i)^{(2k+1)J_1})$$
$$(r = 1, 2, \ldots, R(C_i))$$

where the PCP code is C$_i$, the time spectrum pattern code is Z$_i$, where U(C$_i$)$^r$ corresponds to the code C$_i$ and is a TSP comprising (2k+1)*J elements, where r is a code number allotted to each TSP, and where R(C$_i$) means the size of the TSP codebook corresponding to the code C$_i$.

11. The method of claim 2 wherein said determining step includes using a table of data correlating phonemes to the codebook, spectrum parameter code data, and PCP code data.

12. A phoneme discrimination unit comprising:
- an acoustic analyzer configured to provide voice spectrum parameters and voice powers indicative of the intensity of inputted voice signals;
- a power-change patter (PCP) generator coupled to receive said voice powers from the acoustic analyzer;
- a PCP vector quantizing unit coupled to the PCP generator;
- a time spectrum parameter (TSP) pattern generator coupled to receive said voice spectrum parameters from the acoustic analyzer;
- a TSP vector quantizing unit coupled to receive inputs from said TSP pattern generator and said PCP vector quantizing unit;
- a phoneme determining unit coupled to receive inputs from said TSP vector quantizing unit; and
- an output from said phoneme determining unit.

13. The phoneme discriminating unit of claim 12 further comprising a PCP codebook coupled to said PCP vector quantizing unit.

14. The phoneme discriminating unit of claim 13 further comprising a set of TSP codebooks coupled to said TSP vector quantizing unit.

15. The phoneme discriminating unit of claim 12 further comprising a set of TSP codebooks coupled to said TSP vector quantizing unit.

16. A method of discriminating phonemes from an inputted voice signal comprising the steps of:
- extracting voice powers and spectrum parameters from said inputted voice signal by an acoustic analysis process;
- obtaining a power change pattern (PCP) code from said voice powers;
- processing the spectrum parameters to produce a time spectrum pattern (TSP);
- vector-quantizing the TSP to obtain a TSP code after selecting from among a plurality of TSP codebooks one TSP codebook corresponding to the PCP code; and thereafter
- selecting a phoneme as a function of the PCP code and the TSP code.

17. The method of claim 16 wherein said selecting step includes referring to a previously stored table.

18. The method of claim 16 wherein said step of obtaining a PCP code includes combining a plurality of said voice powers to provide a PCP and vector-quantizing the PCP, including referring to a previously stored PCP codebook.

19. The method of claim 16 wherein said TSP codebooks have been previously stored.

20. The method of claim 16 wherein said acoustic analysis process provides said voice powers and said spectrum parameters for respective time intervals, and the step of selecting a phoneme corresponds to said time intervals.

* * * * *